March 31, 1931. S. MILNE 1,798,801
FOURDRINIER PAPER MAKING MACHINE
Filed Dec. 4, 1929
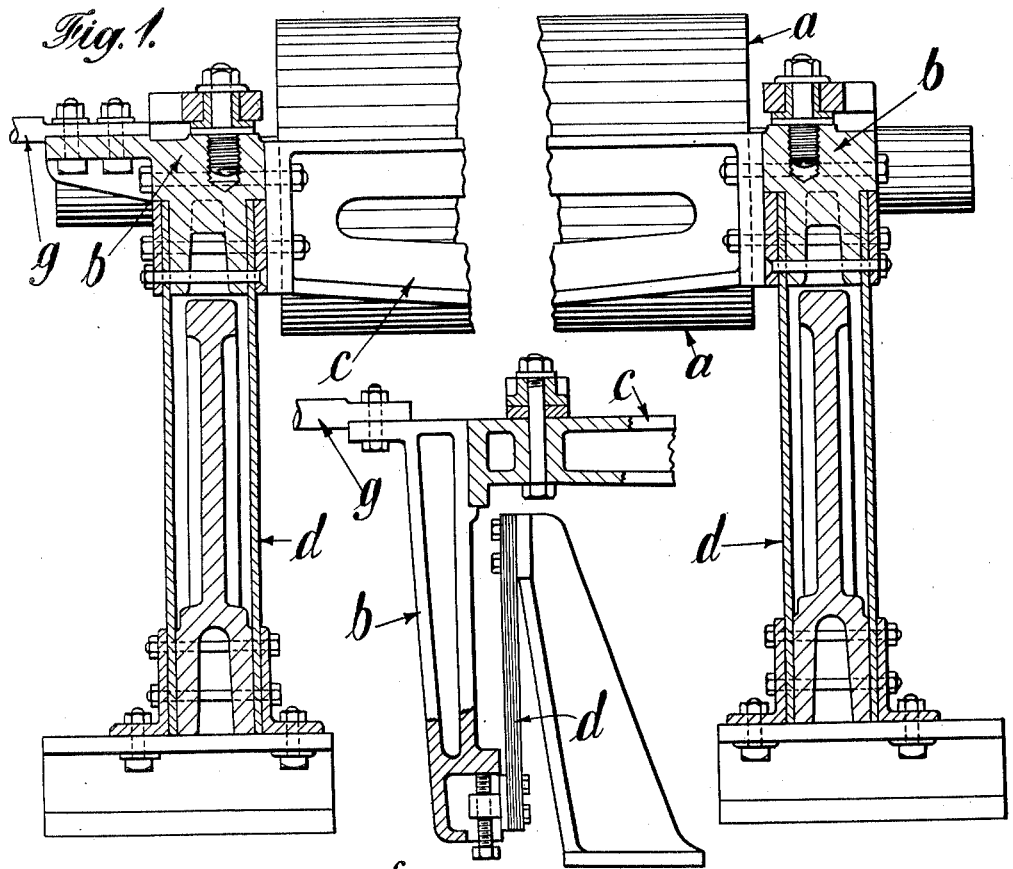
Fig. 1.
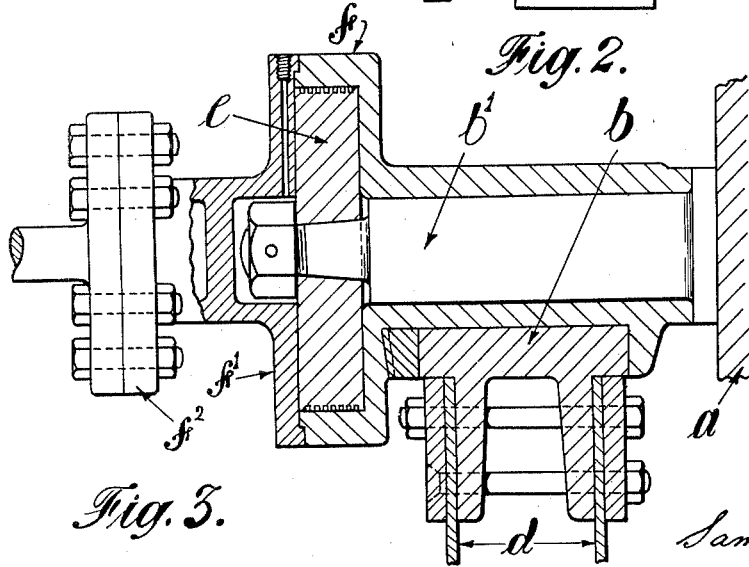
Fig. 2.
Fig. 3.
Inventor:- Samuel Milne.
By his Attorney:- Walter Gunn Patented Mar. 31, 1931

1,798,801

UNITED STATES PATENT OFFICE

SAMUEL MILNE, OF EDINBURGH, SCOTLAND

FOURDRINIER PAPER-MAKING MACHINE

Application filed December 4, 1929, Serial No. 411,705, and in Great Britain February 27, 1929.

This invention refers to Fourdrinier paper making machines, of the kind wherein the breast roll and the wire, are vibrated independently of the tube rolls and tube roll supporting frames, and the object of the invention is to enable the more rapid vibration of the roll and wire without jarring.

In machines of this kind it has been proposed to support the breast roll in bearing frames carried by plate springs arranged vertically, the springs in some cases having been in tension, and in other cases in compression, but in all cases the springs hitherto used have been such that their natural speed or rate of vibration was considerably less than the rate of the required maximum vibration of the roll and wire. That is to say if 200 vibrations of the wire were required per minute, the springs hitherto used have had a much slower natural rate of vibration, say 100 vibrations per minute. This has always necessitated considerable power to operate the roll, owing to the mass and inertia of the vibrating parts.
According to this invention, the springs whether in tension or compression are made to such a strength or stiffness that the natural period or rate of vibration is not less than the required maximum period or rate of vibration of the roll and wire.

According to a further feature of the invention, means are provided on one or both of the breast roll trunnions to effectively take up the strain of reversal of the rapidly vibrating roll, as hereinafter explained.

A still further feature of the invention resides in the attachment of the usual connecting rod of the reciprocating mechanism direct to the bearing for the roll trunnion.
The invention will be described with reference to the accompanying drawing, wherein:—

Fig. 1 is a cross-sectional view of the supporting frames for the breast roll and wire frame, of the kind wherein the springs are in compression, only so much of the roll and frame being shown as is necessary to illustrate the application of the invention.

Fig. 2 is a cross-sectional view of a supporting frame of the kind wherein the springs are in tension.

Fig. 3 is a longitudinal section of a part of a breast roll showing the shock absorbing means.

As shown, the breast roll $a$ is mounted in bearings carried by frames $b$, $b$ secured together by a cross-beam $c$, the frames $b$, $b$, being supported by flat laminated springs $d$. The springs $d$ will be proportioned according to the maximum speed required and to the weight to be moved, but in each instance they will be such that the periodicity of their natural vibration equals or exceeds that of the maximum vibration required.

In thus stiffening the springs, very rapid vibrations can be obtained with practically little or no increase in the power required for vibrating the breast roll, from nil to the maximum stroke. This may be explained by the fact that the first and greater portion of the vibratory movement is obtained from the pendulum action of the springs and vibrating parts, and the power is required only to carry them through the final and smaller portion of their stroke, whereas, in existing systems, the power is required to accelerate, as well as to decelerate, the vibrating parts throughout the greater part of each stroke. In this invention, the power is only applied when the parts are moving at their slowest speed, the effect being similar to the action of a fly-wheel in moving over a dead centre.

The breast roll supporting frames $b$ and springs $d$ at the front and back of the machine are usually identical, but the frames at the front of the machine may be stationary, the cross bar dispensed with, and the springs applied only to the back of the machine. The bearing for the spindle of the back roll may be rigidly secured to the back bracket.

The rapid reversal of the breast roll sets up severe strains and to overcome such strains, a large disc $e$ is applied to the end of the breast roll spindle $b^1$ as shown in Fig. 3 and enclosing such disc is a stationary casing $f$, with cover $f^1$, the disc being a close fit within the casing and the casing being supplied with oil to fill up a film-like space between it and the disc. With the disc of large dimensions, the maximum pressure, at the moment of reversal of the roll, is less than that necessary to squeeze out the oil and such oil thereby absorbs the shock of reversal.

The disc $e$ may be arranged at the back of the machine, or in other words, at the end of the breast roll next the shake mechanism. In addition to absorbing the shock, the oil serves to lubricate the disc.

The connecting rod $g$ between the shake mechanism (not shown) and the vibrating parts, may be connected to the frame $b$ as shown in Fig. 1, but preferably it is connected directly in line with and coaxial with the breast roll. As shown in Fig. 3, this can be done by connecting the rod to the cover $f^1$ of the casing $f$, the cover being flanged at $f^2$ to receive the rod. The connecting rod $g$ may be provided with a ball and socket joint, or the like, so that in the event of any misalignment no strain would come on the breast roll bearing.

Ball or roller bearings may be used to take the weight of the roll, and to take the end thrust, as an alternative to the large disc and casing.

What I claim is:—

1. Means for supporting the breast roll and wire of a Fourdrinier paper-making machine, comprising a stationary side frame vertically disposed flat springs connected at one end to said frame, and a further and vibratory frame secured to the other end of the springs, to carry the roll and wire, the said springs having a rate of natural vibration which is not less than the rate of the required maximum vibration of the roll and wire, and means on the end of the breast roll trunnion to absorb the shock of reversal as set forth.

2. Means for supporting the breast roll and wire of a Fourdrinier paper-making machine, comprising a stationary side frame at each side of the machine, pairs of vertically disposed flat springs embracing each stationary frame and connected at one end to the frame, and further and vibratory frames embraced by and secured to the other end of the pairs of springs, to carry the roll and wire, the said springs having a rate of natural vibration which is not less than the rate of the required maximum vibration of the roll and wire, and means on the end of the breast roll trunnion to absorb the shock of reversal as set forth.

3. Means for supporting the breast roll and wire of a Fourdrinier paper-making machine according to claim 1, wherein the vertically disposed flat springs are laminated, as set forth.

4. Means for supporting the breast roll and wire of a Fourdrinier paper-making machine, comprising a stationary side frame vertically disposed flat springs connected at one end to said frame, and a further and vibratory frame secured to the other end of the springs, to carry the roll and wire, the said springs having a rate of natural vibration which is not less than the rate of the required maximum vibration of the roll and wire, bearing brackets for the breast roll trunnions on the vibratory frames, a disc of large diameter secured to and rotating with one of the breast roll trunnions, a casing in one with the bearing bracket for that trunnion, closely fitting the discs, a cover for the casing, and means to supply oil to the casing, as set forth.

5. Means for supporting the breast roll and wire of a Fourdrinier paper-making machine, comprising a stationary side frame vertically disposed flat springs connected at one end to said frame, and a further and vibratory frame secured to the other end of the springs, to carry the roll and wire, the said springs having a rate of natural vibration which is not less than the rate of the required maximum vibraton of the roll and wire, bearing brackets for the breast roll trunnions on the vibratory frames, a disc of large diameter secured to and rotating with one of the breast roll trunnions, a casing in one with the bearing bracket for that trunnion, closely fitting the disc, a cover for the casing, a flanged extension of the cover adapted to be connected to a connecting rod of reciprocating mechanism, and means to supply oil to the casing, as set forth.

In testimony whereof I have signed my name to this specification.

SAMUEL MILNE.